Dec. 10, 1940.   J. HENRI-LABOURDETTE   2,224,186
BODY OF MOTOR ROAD VEHICLES
Filed Jan. 11, 1938
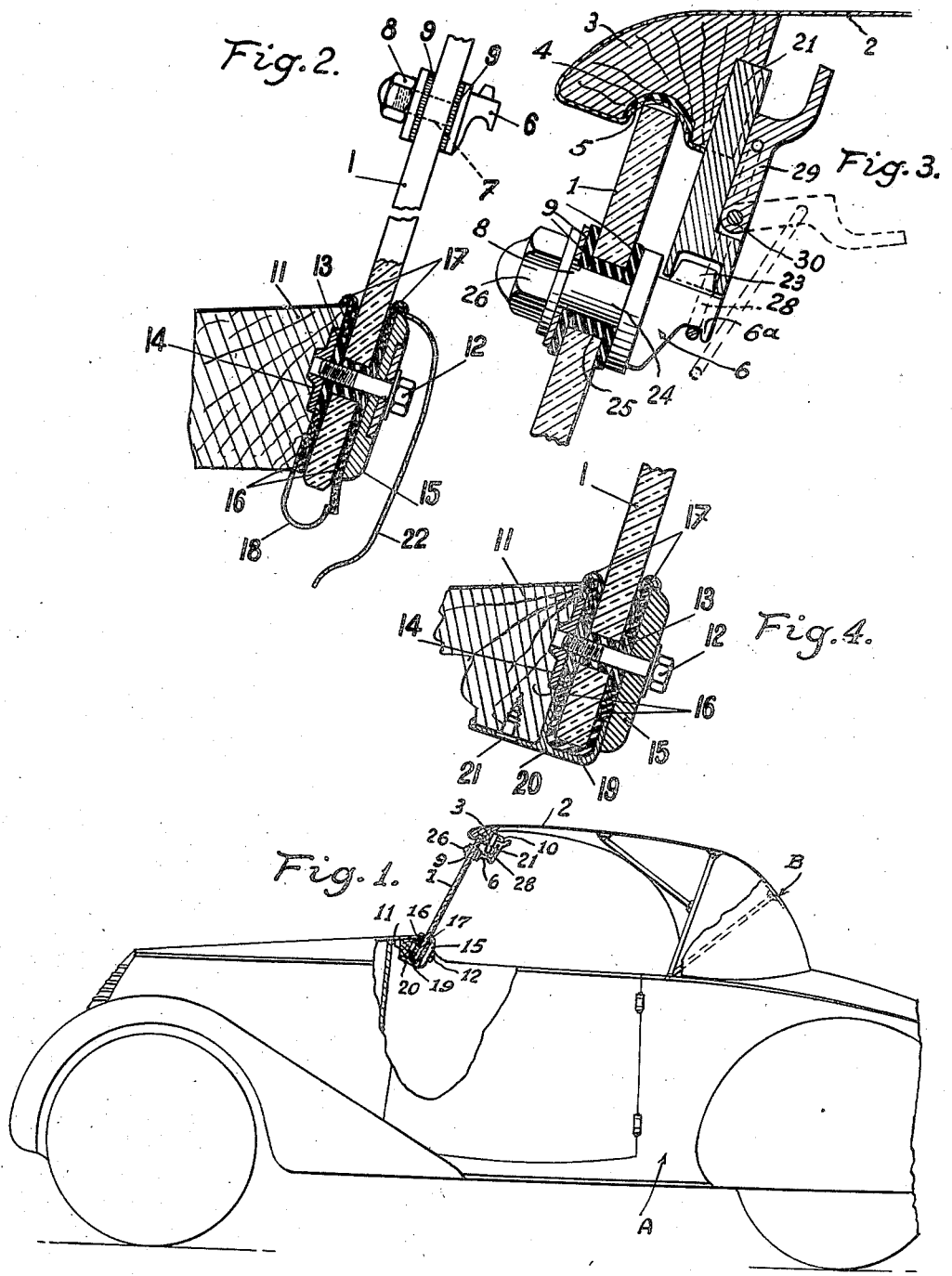
INVENTOR.
Jean Henri-Labourdette.
BY Maxwell E. Sparrow
ATTORNEY.

Patented Dec. 10, 1940

2,224,186

UNITED STATES PATENT OFFICE 2,224,186

BODY OF MOTOR ROAD VEHICLES

Jean Henri-Labourdette, Courbevoie, France

Application January 11, 1938, Serial No. 184,379
In France January 25, 1937

8 Claims. (Cl. 296—84)

This invention relates to bodies of automotive vehicles and more particularly to those in which the windshield is adapted to support the forward end of a roof structure which may be folded back or otherwise moved.

The object of the present invention is to provide means to enable passengers and more particularly the driver of a vehicle which is equipped with a body made in accordance with this invention to have an unobstructed forward view. To this end said body is provided with a frameless and pillarless windshield having means attached along its lower edge to the cowl and also adjacent the upper edge of said windshield for enabling the front transverse roof member to be directly connectible to or disconnectible from the windshield.

In the accompanying drawing:

Fig. 1 is an elevational view, partly in section, of a body with a foldable roof structure according to the invention;

Figure 2 is a sectional side elevation of a frameless windshield constructed and secured to a body according to one embodiment of this invention;

Figure 3 is a fragmentary view showing one method of attaching a roof member to the windshield illustrated in Figure 1, and, Figure 4 is a view similar to the lower portion of Figure 2 illustrating a modification.

The body according to the invention comprises a lower part A constructed in known manner, and a foldable hood (top) B which is carried by pivotally mounted hoops and is adapted to be folded back towards the rear of the vehicle, and the front part of which is supported by the windshield 1. For this purpose the front part of the top 2 terminates by a crosspiece 3 which is fixed on the windshield by a system of removable clips 10.

As shown in Fig. 2 the windshield 1 consists solely of a frameless, durable glass panel without any side pillars, the lower edge of said panel being clamped against the cowl 11 by means of a bar 15 and bolts 12, each of said bolts passing through a rubber sleeve or bushing 13 inserted into a suitable hole also provided in the windshield 1 for that purpose, said bolts coacting with metal fittings 14 attached to the said cowl 11. Strips 16 of sponge rubber and rubber-beading strips 17 are interposed between the windshield 1, cowl 11 and bar 15.

In the embodiment illustrated in Figure 1, the lower edge of the windshield 1 is free and a drip channel 18 is provided a short distance below same but according to Figure 3 said edge is encompassed by a rubber lined channel member 19 provided with a flange 20 by means of which said member is secured by screws 21 to the cowl 11. The bolts 12 may, if desired, be concealed by means of a moulding 22 (Figure 1).

In order that a hood or roof 2 may be fastened to the upper edge of the windshield 1, the front cross frame member 3 of said hood is provided on its underside with a groove 4 lined with a rubber strip 5 wherein the upper edge of said windshield is adapted to seat and is adapted to be drawn into contact with the upper edge of said windshield by means of conventional buckle or clip devices 10 of the come-along type having each a gripping member and a wire loop, each of said devices being adapted to engage with a complementary hook member 6 secured to the windshield 1, adjacent its upper edge, by means of a threaded stem 7 passing through a hole of said windshield and a nut 8, rubber washers 9 being interposed between said metal parts on each side of the windshield.

The clip shown in Fig. 3 comprises a body 21 which is fixed on the cross-piece 3 and is extended in the downward direction by a hollow rod, the end of which is adapted to engage on a tenon 23 of the hook 6. Said hook is fixed on the windshield glass, as shown, by means of a rod 24 passing through a hole 25 provided in said glass and is clamped against said glass by a nut 26. Washers and a packing 9 made of a resilient material, for example of rubber, are arranged between the metal parts and the glass. For fixing and pressing the part 21 on the hook 6, a connecting rod made of steel wire 28 is arranged in such a manner as to engage behind the nose 6a of the hook 6; the upper end of said connecting rod is pivoted on an eccentric lever 29 which is pivotally mounted on a pin 30 of the body 21. It will be understood that it suffices to push back or to lift the lever 29 in order to cause the lower end of the connecting rod 28 to move downwards or upwards, and to enable same to be disengaged from the hook 6 and to separate the two parts of the coupling.

From the above it can thus be seen that there has been devised a windshield structure for automotive vehicles of the type having a removable roof portion, and which comprises a frameless and pillarless panel of transparent material provided with a series of apertures in spaced relation and along its upper and lower edges, respectively, attachments spacedly arranged and engaging said apertures for connecting said panel to a vehicle, and resilient members for said attachments, said resilient members being located between said apertures and said attachments, said attachments on said lower edge being adapted to permanently secure said panel to a part of said vehicle, said attachments on said upper edge for supporting and removably fastening a roof portion to said panel.

Having thus described my invention, what is claimed as new and desired to be secured by Letters Patent, is:

1. In an automotive vehicle body provided with a cowl and a foldable roof structure; the combination with a frameless windshield having a free upper longitudinal edge and a series of apertures along and adjacent its longitudinal edges, upper and lower, respectively, and of fastening means fitted in said apertures, said means adjacent said lower edge for resiliently attaching said windshield to said cowl, said means adjacent said upper edge adapted to releasably secure a part of said roof structure thereon when said roof is brought into engagement with said free edge of said windshield.

2. In an automotive vehicle body provided with a cowl and a foldable roof structure; the combination with a frameless windshield having a free upper longitudinal edge and a series of apertures along and adjacent its longitudinal edges, upper and lower, respectively, and of fastening means provided with a resilient liner and fitted in said apertures, said means adjacent said lower edge for attaching said windshield to said cowl, said means adjacent said upper edge being adapted to releasably and resiliently secure a part of said roof structure thereon when said roof is brought into engagement with said free edge of said windshield.

3. In an automotive vehicle body provided with a cowl and a foldable roof structure; the combination with a frameless windshield having a free upper longitudinal edge and a series of apertures along and adjacent its longitudinal edges, upper and lower, respectively, and of fastening means provided with a resilient liner and fitted in said apertures, said means adjacent said lower edge for attaching said windshield to said cowl, said means adjacent said upper edge being provided with a hook and adapted to releasably and resiliently secure a part of said roof structure thereon when said roof is brought into engagement with said free edge of said windshield.

4. In an automotive vehicle body provided with a cowl and a foldable roof structure; the combination with a frameless windshield having a free upper longitudinal edge and a series of apertures along and adjacent its longitudinal edges, upper and lower, respectively, said roof structure having a forward cross-member provided with a resilient liner, and of fastening means fitted in said apertures, said means adjacent said lower edge for resiliently attaching said windshield to said cowl, said means adjacent said upper edge being adapted to releasably secure a part of said roof structure thereon when said resilient liner of said roof is brought into engagement with said free edge of said windshield.

5. In an automotive vehicle body provided with a foldable roof structure; the combination with a frameless windshield having free longitudinal edges, upper and lower, respectively, of attachments spaced apart from each other and connected to said lower edge for permanently securing said windshield to a portion of said body, and clipping means connected to said upper edge and said roof structure, respectively, for removably engaging said roof structure with said upper edge of said windshield.

6. In an automotive vehicle body provided with a foldable roof structure; the combination with a frameless windshield having free longitudinal edges, upper and lower, respectively, of attachments spaced apart from each other and passing through holes of said lower edge for permanently securing said windshield to a portion of said body, and clipping means connected with said upper edge and said roof structure, respectively, for removably engaging a portion of said roof structure with said upper edge of said windshield.

7. In an automotive vehicle body provided with a foldable roof structure having a cross-member at its forward portion; the combination with a frameless windshield having free longitudinal edges, upper and lower, respectively, said windshield being provided with holes adjacent said free edges, of attachments spaced apart from each other and passing through said holes at said lower edge for permanently securing said windshield to a portion of said body, and clipping means, one part of said means passing through said holes at said upper edge, another part of said means being affixed to said roof structure and being adapted to cooperate with said one part for removably engaging said cross-member with said upper free edge of said windshield.

8. A windshield structure for automotive vehicles of the type having a removable roof portion, comprising a frameless and pillarless panel of transparent material provided with a series of apertures in spaced relation and along its upper and lower edges, respectively, attachments spacedly arranged and engaging said apertures for connecting said panel to a vehicle, and resilient members for said attachments, said resilient members being located between said apertures and said attachments, said attachments on said lower edge being adapted to permanently secure said panel to a part of said vehicle, said attachments on said upper edge for supporting and removably fastening a roof portion to said panel.

JEAN HENRI-LABOURDETTE.